Patented June 6, 1939

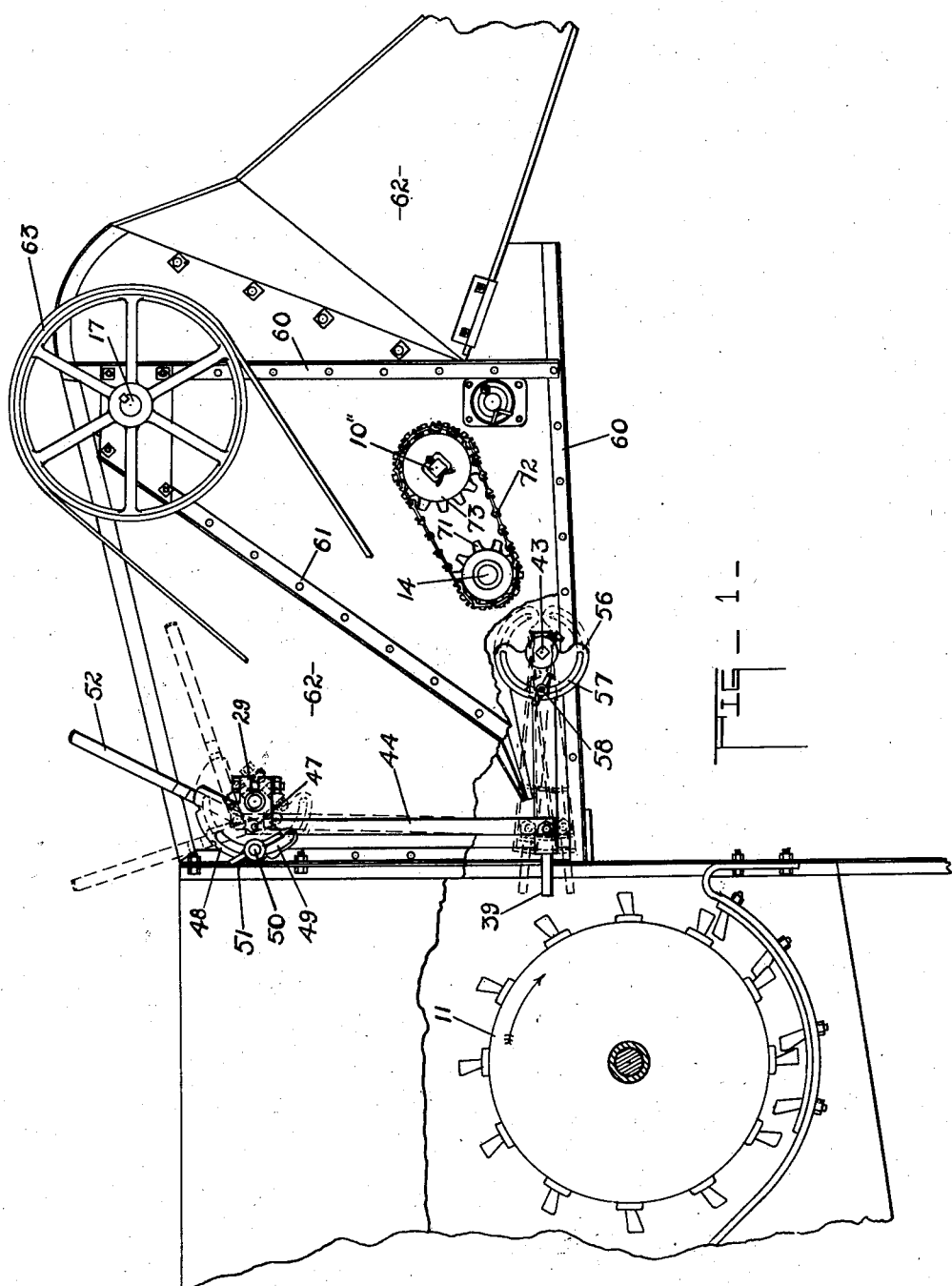

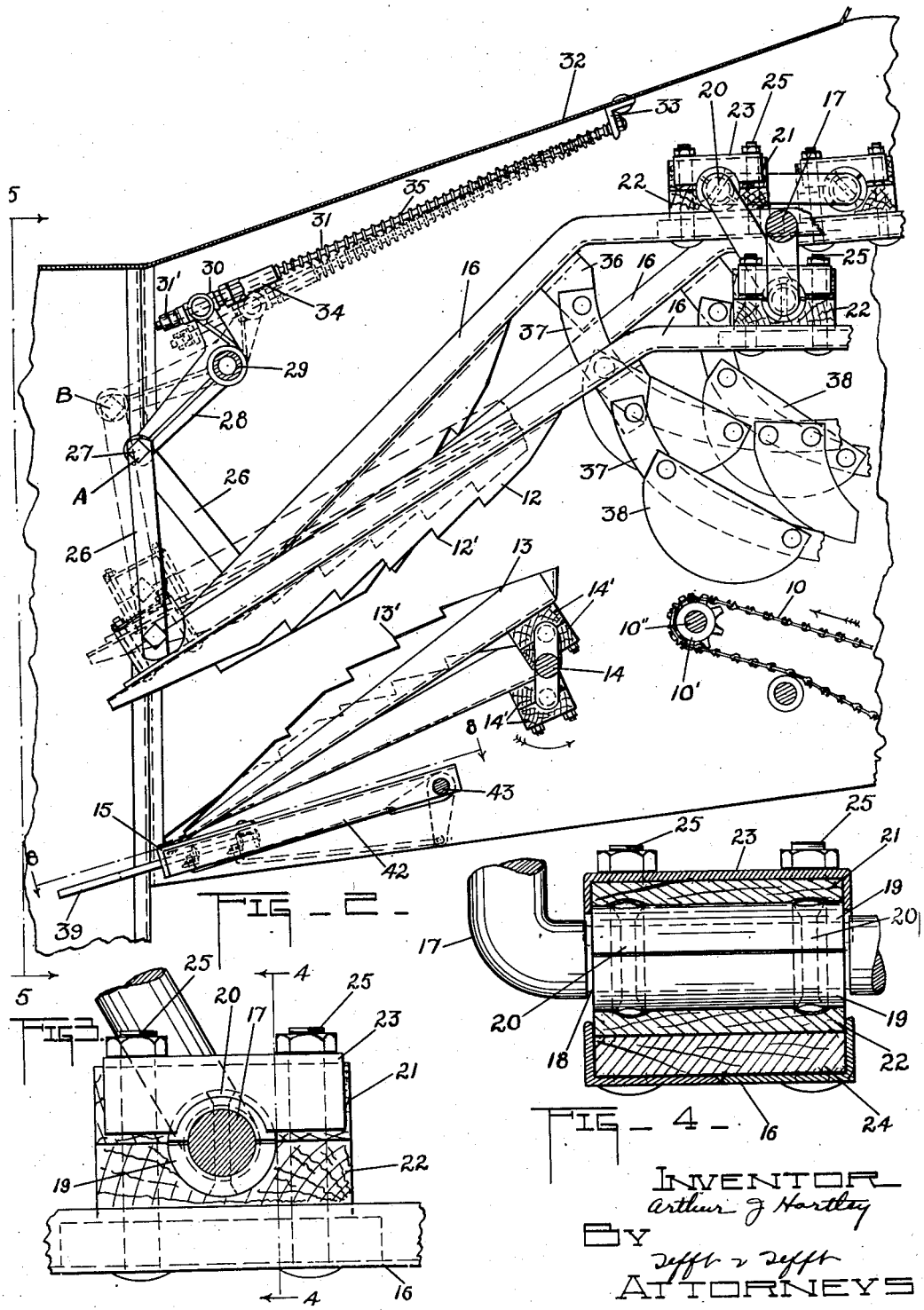

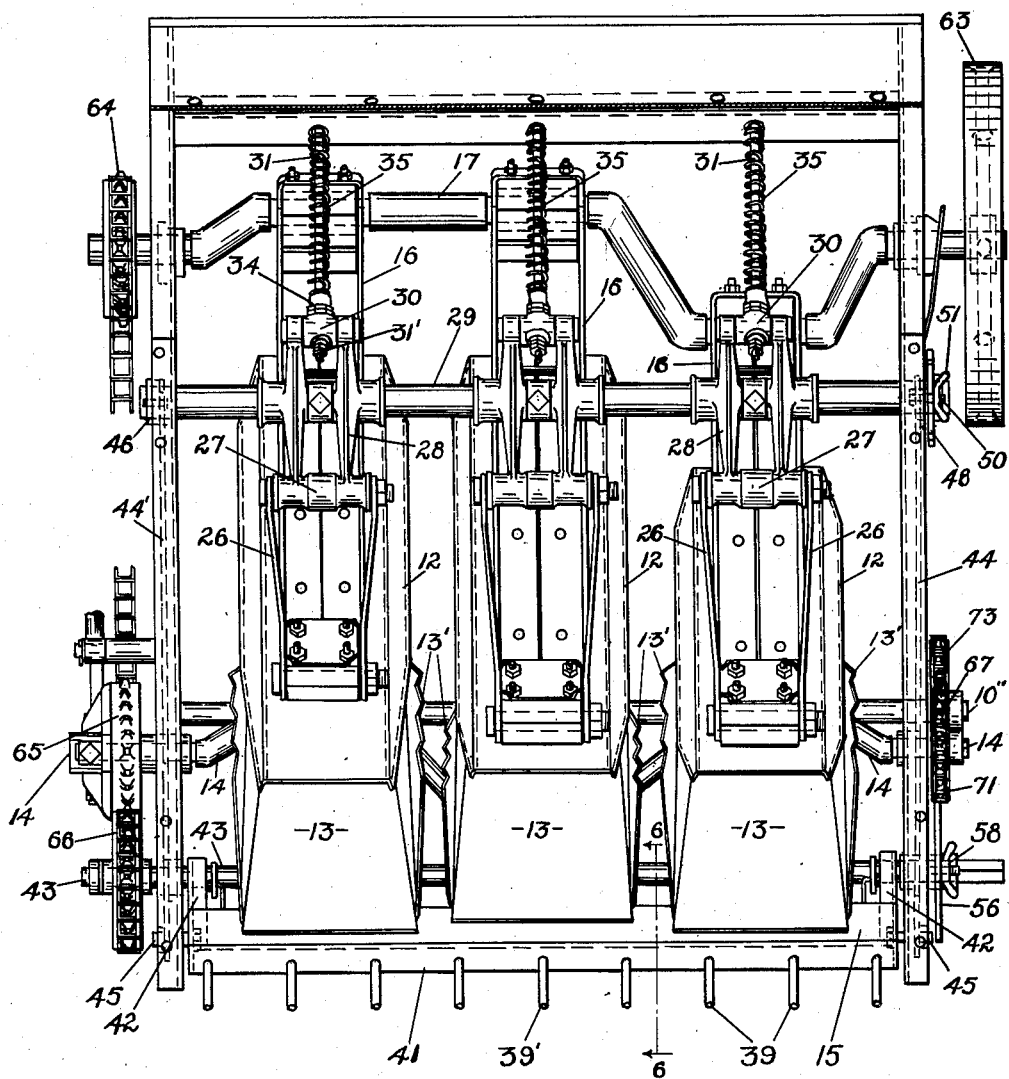

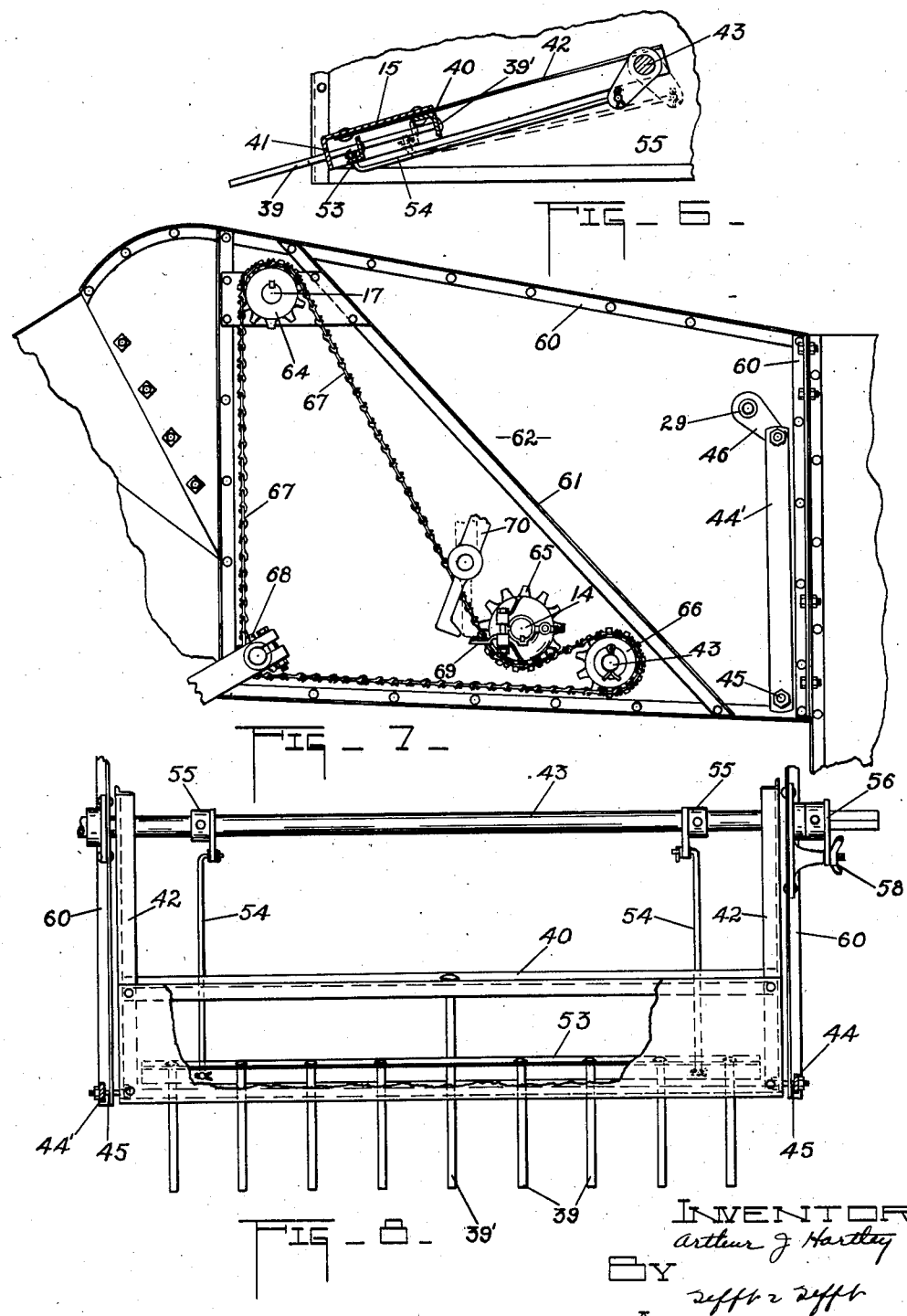

2,161,042

UNITED STATES PATENT OFFICE 2,161,042

THRESHER FEEDER MECHANISM

Arthur J. Hartley, Peoria, Ill.; The Central National Bank and Trust Company of Peoria and Neta S. Hartley, executors of said Arthur J. Hartley, deceased, assignors to Hart-Carter Company, Peoria, Ill., a corporation of Delaware Application October 14, 1935, Serial No. 44,841

3 Claims. (Cl. 130—1)

This invention has reference to feeding apparatus for threshers, and has for one of its objects to provide a feeding device which includes means for inserting bales of grain into a thresher in a properly regulated manner.

Another object lies in the provision of a feeder apparatus including means for combing the grain prior to its being operated upon by the thresher cylinder.

A further object is to provide means for combing the grain as aforesaid, which means is made adjustable for the purpose of regulating the flow of grain to the cylinder.

Another object is to provide means capable of receiving grain and inserting the same into a thresher, which means is made automatically adjustable to accommodate grain bundles of various sizes and densities.

An additional object is to provide feeding members which are operated by means of crank and pitman mechanisms as will be described, which mechanism is provided with novel means for connecting the crank and pitman.

Other and additional objects will appear in the following description and accompanying drawings in which:

Fig. 1 is a side elevational view showing portions of my invention to be described;

Fig. 2 is a side elevational view with certain portions of the cover and mechanism removed showing details to be described;

Fig. 3 is an enlarged view showing details of mechanism to be referred to;

Fig. 4 is a sectional view taken from line 4—4 in Fig. 3;

Fig. 5 is an end elevational view taken in the direction of arrows 5—5 in Fig. 2;

Fig. 6 is a sectional detail view taken on line 6—6 in Fig. 5;

Fig. 7 is an elevational view showing the side of the device opposite the side shown in Fig. 1; and Fig. 8 is a plan view taken on line 8—8 in Fig. 2.

Apparatus embodying my invention are usually attached to threshing machinery which is so well known that drawing and description thereof is thought unnecessary.

Machines of the class herein described are conventionally provided with approach conveyors upon which bundles of grain are placed for transportation into the feed and regulating device comprising my invention. Conveyors of various types are well known and detail disclosure of those shown herein is thought unnecessary.

In the accompanying drawings I show the inner end of a feed conveyor designated 10 in Fig. 2, which is assumed to extend toward the right a sufficient distance to permit convenient handling of the grain bundles to be fed, and to be driven in the direction of the arrow to transport the bundles into the feeder by means of a sprocket 10' mounted upon a driving shaft 10''.

At the left in Fig. 1, I show a conventional threshing cylinder 11, which is assumed to be a part of a threshing machine to which my device is attached.

Devices for propelling bundles of grain from the conveyor into the thresher consist of upper and lower feed pans 12 and 13, a series of three of each being shown, although a larger or smaller member may be used.

The upper ends of lower pans 13 are mounted on cranks of a shaft 14 by means of bearing block assemblies 14'. The shaft extends across the apparatus, with the several cranks arranged in equal spacing around the shaft.

The lower ends of pans 13 are slidably supported upon a transversely disposed angle strip 15, as shown in Figs. 2 and 5. Shaft 14 rotates in the direction of the arrow in Fig. 2 to cause feeding movements of the pan consisting of upward, downward and forward movement toward the left and downward and backward movement toward the right. Tooth portions 13' of the pan are so fashioned as to have a hooking action upon incoming bundles of grain and the motion described obviously causes the grain to be propelled toward the threshing cylinder.

The upper pans 12 are similar in form to pans 13, but are inverted so as to present the teeth 12' to the upper side of the grain bundles.

The upper pans are secured to frame structures 16, having a channel cross section, which are fashioned and arranged to be supported at their upper ends by means of bearing blocks journalled on cranks formed on a shaft 17. The cranks are equally spaced around the shaft as shown in Fig. 2. As driven by the cranks of shaft 17, the upper pans operate in a manner similar to pans 13, and co-operatively therewith.

The bearing block and crank structure is of novel design and is shown in detail in Figs. 3 and 4.

The crankshaft is preferably made from a bar which is bent to form the crank portions. The journal portions of the cranks are finished in the usual manner, the finishing cut providing a depressed surface as at 18 in Fig 4. Surrounding the finished surface are two half cylindrical bushing members 19, secured by means of countersunk rivets 20.

Application of the bushings as noted obviously provides an enlarged bearing area at a point where considerable wear would usually occur.

Use of this simple novel bushing arrangement enables me to utilize a crank shaft made from a rod having suitable dimensions for strength, but not of a size to provide proper bearing area for efficient operation and wear resistance. To otherwise provide a crank shaft having sufficiently enlarged bearing area in the crank portions would require that the shaft be made from expensive castings or forgings.

As noted, I have devised a novel and simple means for increasing the bearing area of the cranks.

The bearing blocks journalled on bushings 19 consist of upper and lower sections 21 and 22 preferably made from anti-friction material such as impregnated wood.

Metallic cap members 23 are fitted over sections 21 and the lower sections 22 rest upon filler blocks 24. The assemblies are held in place by means of bolts 25 passing through members 16.

The lower ends of pans 12, and frames 16, are supported by means of attachment to the free ends of depending link members 26 which are pivotally supported at 27 upon arms of bell cranks 28. The bell cranks are pivotally supported upon a transversely disposed shaft 29.

The upper arms of the bell cranks are pivotally attached to head members 30 which are slidably mounted upon rods 31 which are movably attached at their upper ends to the top portion 32 of the supporting frame structure by means of brackets 33. Movement of heads 30 toward the free ends of rods 31 is limited by nuts 31'.

Mounted on rods 31, inside the heads 30, are slidable sleeve members 34 and pressing against these are coil springs 35 which are confined on rods 31 and react between brackets 33 and the upper arms of bell cranks 28 to resiliently resist upward movement of pans 12 toward the position shown in dotted lines.

It is to be particularly noted that I arrange the positions of the two arms of the bell cranks 28 with respect to each other and with respect to the pans 12 so that the pressure of springs 35, as applied at pivots 27, is substantially constant at all points between positions A and B.

The function of springs 35 is obviously to press the upper pans downwardly, which action causes the pans to press with greater force upon bundles of grain lying between the upper and lower pans. This function will be again referred to.

Near the upper bearings of frames 16 are bracket members 36, to which are pivotally attached the inner ends of bars 37 which carry cutter knives 38. The opposite ends of bars 37 are supported by means not shown. The knives are not a part of this invention. They are actuated by the upper pan mechanism and their function is obviously to cut the twine with which the grain bundles are bound as the bundles ride in over the feed conveyor 10 into the feeding pans 12 and 13.

In Figs. 1, 2, 5 and 6 I show what may be called a combing mechanism, the function of which is to retard the flow of grain into the threshing cylinder mechanism.

It is well known that under practical working conditions the characteristics of grain and bundles thereof vary widely. Some bundles may be quite compact while others are loose. Some may be somewhat damp while others are dry, and there may be further variation in the quality of grain plants.

It is also well known that the rapidly revolving threshing cylinders tend to "grab" the grain stalks so that when a compact bunch is presented to the cylinder it is inducted into the thresher in a form which is liable to cause a jam, or at least in a form unsuited to efficient threshing.

It is obviously desirable to feed the grain to the cylinder in a uniformly distributed manner, and to this end I provide the combing mechanism noted.

The device consists of a series of rods or tines 39 arranged across the front of the feeder as shown in Figs. 1 and 5 to 7.

One or more of the tines, such as is designated 39', is secured in front and rear rail members 40 and 41 and projects a suitable distance outwardly of rail 41 as shown.

Rails 40 and 41 are secured at each end to arm members 42, in the arrangement shown in Figs. 6 and 7. The arm members are pivotally supported upon a shaft 43.

The free end of the assembly just described is supported by links 44 and 44', which are pivotally attached to each end of the structure by means of studs 45.

The upper end of link 44' is pivotally attached to the outer end of an arm 46 which is secured to the end of shaft 29 and link 44 is attached in the same position relative to the shaft, at the oposite end, by means of a stud 47 secured in a quandrant structure 48. The quadrant is secured to shaft 29 and is provided with a slot 49 which lies upon an arc having shaft 29 at its center. A clamping mechanism, comprising a screw 50 secured in the supporting frame structure, passing through the slot and carrying a thumb nut 51, is adapted to lock the quadrant, and the shaft 29, in any position of adjustment permitted by the slot.

An accessible handle 52 is secured to the quadrant and provides a convenient means for adjusting the quadrant.

It will be apparent that the mechanism described provides a means for elevating and lowering the tines 39 with respect to the threshing cylinder. By means of the handle the quadrant and shaft 43 are operated to adjust the tines to any desired position and the thumb nut is tightened upon the quadrant to lock the mechanism in position.

In addition to the vertical adjustment just noted I provide means whereby the tines may be moved in a horizontal line toward or away from the threshing cylinder, as follows:

Referring to Figs. 1, 6 and 7, it will be noted that tines 39 are secured at their inner ends to a transverse rail 53 disposed between rails 40 and 41. Rail 53 is mounted to slide longitudinally of tine 39' and tines 39 are mounted to slide in holes in rail 41. Tine 39' thus forms a support for the central portion rail 53 while tines 39 support the outer ends of the rail.

A pair of connecting rods 54 are connected to rail 53 at opposite sides of tine 39' and their opposite ends are pivotally connected to arms 55 which are secured to shaft 43. Shaft 43 has a quadrant 56 secured to the outer end. The quadrant has a slot 57 and is provided with a locking screw mechanism 58 similar to screw and nut 50 and 51.

Solid and dotted lines in Fig. 6 illustrate that rotation of shaft 43 causes backward and forward movement of rail 53, and in this manner tines 39 are moved toward or away from the threshing cylinder. The quadrant 56 mechanism obviously provides means for adjusting and locking the tines in desired position.

It will be apparent that, by means of the mechanisms just described the tines 39 may be independently adjusted vertically or horizontally to place the ends thereof in any suitable position with respect to the threshing cylinder.

The foregoing has described the mechanism of my invention. The several shafts noted are assumed to be mounted in suitable conventional bearings which are supported in suitable obvious manner upon a frame structure of suitable strength and dimensions.

As herein shown the frame structure comprises a skeleton of steel frame and brace members 60 and 61 bolted together and preferably boxed with top and side sheets 32 and 62. Frame structures of the general type shown are thought so well known as to render detail description unnecessary.

The mechanism is operated through a pulley 63 which is belted to a power source not shown.

Pulley 63 is affixed to shaft 17 which it drives, see Figs. 1 and 7. Shaft 17 carries a sprocket 64 which has driving connection through a chain 67 with a sprocket 65, which is mounted on shaft 14. The chain is trained over an idler sprocket 66 which idles on an extending end of shaft 43, its function being to hold the chain in proper engagement with sprocket 65. An adjustable idler 68 is utilized to take up slack in the chain. In Fig. 1 it is shown that shaft 14 carries a sprocket 71 which has driving connection through a chain 72 with a sprocket 73 affixed to shaft 10″, by means of which conveyor 10 is operated in accompaniment with shaft 14. In the manner described, power supplied through pulley 63 is distributed to drive the several elements of the device.

The sprocket designated 65, on shaft 14, is a part of a special clutch mechanism by means of which the shaft 14, which operates the lower pans 13, is connected or disconnected from the driving elements, whereby the feeding action of pans 13 is controlled in accordance with certain conditions of feed.

The clutch mechanism and its functioning in relation to feed conditions are not a part of the present invention and will therefor not be described further than to say that the clutch has an extending member 69 by means of which the clutch is operated, and a co-operative member 70 which operates the member 69. Member 70 has operative connection with devices not shown for the purpose of regulating the feeding function as above noted.

In operation, bundles of grain are placed upon the conveyor 10 and are thence conducted under knives 38, where the binding twines are cut, and into position to be engaged by feeding pans 12 and 13 which work co-operatively to propel the grain over tines 39 into position to be engaged by the threshing cylinder 11 which rotates in direction of the arrow to conduct the grain stalks into the thresher.

The feeding pans 12, being yieldably mounted as described, are adapted to ride upon the grain as it passes between them so as to accommodate thick or thin bundles, and the springs 35 obviously press the pans downwardly into firm engagement with the grain. As already noted, the mechanism through which springs 35 operate distribute the power of the springs in such a manner that the pressure on the pans is substantially equal at any position and it will be apparent that while the pans 12 yield to accommodate bundles of various thicknesses, the pressure does not build up when a thick bundle elevates the pan and does not diminish as the pan moves downwardly in accommodation to a thin bundle.

In the above manner equal feeding pressure on bundles of all sizes is assured.

Finally, as the grain passes over the tines 39 and is engaged by the threshing cylinder, its flow to the cylinder is regulated by means of the tines as will be obvious.

The condition of the grain or feeding thereof into the device will dictate the proper adjustment of the tines. For grain which, for example, flows evenly and freely the tines are withdrawn away from the cylinder, and perhaps lowered, so as to allow free passage of the grain to the cylinder whereas if the grain is wet, tangled or other conditions require, the tines are elevated and/or adjusted toward the cylinder so that the grain, when engaged by the cylinder must be drawn through the comb-like series of tines, by which it is retarded sufficiently to prevent danger of unsatisfactory feeding to the cylinder.

The foregoing has described my invention, which includes means for preventing wear on certain of the operating parts, means for equalizing operation of the feed elements and means for regulating the flow of fed grain into the thresher.

Modifications of structure are obviously possible without alteration of the principle involved. I do not wish to be limited in structure or function except within the scope of the appended claims.

What I claim is:

1. In a threshing machine feed mechanism including substantially conventional lower and upper feed pans and actuating means therefor, clog prevention mechanism including means for causing the upper feed pans to yield to the pressure of surplus grain fed to said mechanism, said means comprising a bell crank lever for each pan pivotally mounted upon the frame structure at its elbow and having a downwardly inclined arm, a link connecting the outer end of the said arm with the forward end portion of the pan, a rod disposed above and extending longitudinally of the pan and secured at one end to the machine frame at a point adjacent the mechanism actuating said pan, a compression spring on said rod, a reciprocable sleeve upon the free end of said rod normally pressed by said spring toward said free end, and connection between said sleeve and the other arm of the lever for yieldingly holding the latter in position to maintain the pan in its lowest position.

2. In a threshing machine feed mechanism including substantially conventional lower and upper feed pans and actuating means therefor, clog prevention mechanism including means for causing the upper feed pans to yield to the pressure of surplus grain fed to said mechanism, said means comprising a bell crank lever for each pan pivotally mounted upon the frame structure at its elbow and having a downwardly inclined arm, a link connecting the outer end of the said arm with the forward end portion of the pan, a rod disposed above and extending longitudinally of the pan and secured at one end to the machine frame at a point adjacent the mechanism actuating said pan, a compression spring on said rod, a reciprocable sleeve upon the free end of said rod normally pressed by said spring toward said free end, and connection between said sleeve and the other arm of the lever for yieldingly holding the latter in position to maintain the pan in its lowest position, said spring being of great length relatively to the maximum arc of movement of the lever and consequent travel of the sleeve on said rod, thereby to cause the pressure of the spring on the sleeve to vary only slightly at all points in the travel of said sleeve.

3. In a threshing machine feed mechanism including substantially conventional upper and lower feed pans and actuating means for the same, clog prevention mechanism including a bell crank lever for each pan pivotally supported at its elbow portion on the machine frame and having a long arm projecting downwardly and forwardly to overlie substantially the forward end of the pan in spaced relation thereto, a link suspension connection between the end of said arm and the pan, said lever having a short arm, a sleeve connected with the latter, a rod rigidly connected at one end with the frame and upon the other end of which said sleeve is slidably mounted, a stop on the rod for limiting the movement of the sleeve in one direction for retaining the lever in the position for supporting the pan in its lowermost path of travel, and a long light compression spring on said rod for yieldingly maintaining said sleeve engaged with said stop.

ARTHUR J. HARTLEY.